(12) United States Patent
Iwamoto (10) Patent No.: US 8,804,078 B2
(45) Date of Patent: Aug. 12, 2014

(54) LIQUID CRYSTAL DISPLAY

(75) Inventor: Yoshihisa Iwamoto, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 190 days.

(21) Appl. No.: 13/076,532

(22) Filed: Mar. 31, 2011

(65) Prior Publication Data

US 2011/0242477 A1 Oct. 6, 2011

(30) Foreign Application Priority Data

Apr. 1, 2010 (JP) ................ 2010-085162

(51) Int. Cl.
*G02F 1/1337* (2006.01)

(52) U.S. Cl.
USPC ............................ 349/129; 349/128

(58) Field of Classification Search
USPC ............................ 349/129, 141, 128
See application file for complete search history.

(56) References Cited

U.S. PATENT DOCUMENTS

| | | | |
|---|---|---|---|
| 7,714,968 B2 * | 5/2010 | Iwamoto | 349/130 |
| 2004/0165136 A1 * | 8/2004 | Sugiyama et al. | 349/143 |
| 2007/0206141 A1 * | 9/2007 | Lu et al. | 349/129 |
| 2008/0117374 A1 * | 5/2008 | Iwamoto | 349/143 |
| 2011/0299019 A1 | 12/2011 | Sasaki et al. | |

FOREIGN PATENT DOCUMENTS

| | | |
|---|---|---|
| JP | 4-107978 A | 4/1992 |
| JP | 2000-155317 A | 6/2000 |
| JP | 2008-129050 A | 6/2008 |
| JP | 2008-275974 A | 11/2008 |
| JP | 2009-122271 A | 6/2009 |

* cited by examiner

*Primary Examiner* — Jessica M Merlin
(74) *Attorney, Agent, or Firm* — Birch, Stewart, Kolasch & Birch, LLP (57) ABSTRACT

The liquid crystal display comprises a first substrate having a first electrode formed on one side, and a second substrate having a second electrode formed on one side and which is placed opposite to the first substrate so that the second electrode and the first electrode of the first substrate face each other. A liquid crystal layer is provided between the first substrate and the second substrate. The first electrode includes a plurality of first openings provided in a regular checkered pattern with each first opening having a shape extending in a first direction. The second electrode includes a plurality of second openings provided in a regular checkered pattern with each second opening having a shape extending in the first direction. The plurality of first openings and the plurality of second openings are relatively arranged so that each of the plurality of first openings is positioned between two second openings which are adjacent in a planar view among the plurality of second openings.

6 Claims, 11 Drawing Sheets

LIQUID CRYSTAL DISPLAY

BACKGROUND OF THE INVENTION

1. Field of the Invention

The present invention relates to a liquid crystal display with a plurality of openings (slits) formed on an electrode.

2. Description of the Background Art

As an information display device, a display device with extremely low display brightness of the background display area or the dark display area is demanded, and a vertical alignment liquid crystal display is known as a display device capable of realizing the same. A vertical alignment liquid crystal display is able to achieve extremely low transmissivity in the initial oriented state since the optical characteristics during the front face observation in the initial oriented state are approximately equal to the optical characteristics in a polarizing plane of a crossed nicols arrangement.

With the foregoing vertical alignment liquid crystal display, in order to obtain favorable viewing-angle characteristics even during voltage application, it is effective to separate the orientation direction of the liquid crystal molecules into a plurality of directions in one pixel (multi-domain orientation), and various types of technologies have been proposed for realizing the same. For example, Japanese Patent No. 4107978 (Patent Document 1) discloses an electrode structure for realizing the foregoing multi-domain orientation in a segment display-type liquid crystal display. With this liquid crystal display, the upper and lower electrodes placed opposite each other are respectively provided with elongated rectangular openings, and the upper and lower electrodes are arranged so that the openings of the upper electrode and the openings of the lower electrode are alternately aligned in the planar view. Since it is thereby possible to generate a diagonal electric field around the respective openings, the orientation direction of the liquid crystal molecules can be rotated 180° with the opening as the boundary. Patent Document 1 discloses a liquid crystal display in which rectangular openings are alternately arranged on the opposed upper and lower substrates as an effective electrode structure even for an arbitrary display pattern upon mainly performing a character (segment) display pattern.

With a liquid crystal display provided with numerous rectangular openings described above, depending on the layout of the openings, the orientation of the liquid crystal molecules may become uneven, and there are cases where problems such as deterioration in the effective aperture ratio or deterioration in the response speed during voltage application may occur. As one solution to the foregoing problems, Japanese Published Unexamined Patent Application No. 2009-122271 (Patent Document 2) discloses technology of causing the mutual distance of two openings which are adjacent in the longitudinal direction to be shorter than the length (slit width) of the respective openings in the lateral direction with respect to a plurality of rectangular openings provided on a substrate. According to the foregoing technology, it is possible to resolve problems caused by unevenness of in-plane etching or the like upon forming the respective openings by performing patterning treatment to the electrode.

Meanwhile, with the method proposed in Patent Document 2, if the length of the openings in the lateral direction is to be further shortened, it is necessary to consequently shorten the mutual distance of the foregoing openings in the longitudinal direction. However, if the mutual distance of the openings in the longitudinal direction is set to be shorter, there are cases where the adjacent openings become connected depending on the patterning treatment conditions; for example, based on the over-etching conditions. If this kind of connection of openings occurs frequently, it will incur a rise in the resistance value of the electrode, and there is concern that the display quality will deteriorate. Moreover, if all openings adjacent in the longitudinal direction become connected, it will incur the disconnection of the electrode, and there is concern that a display defect will occur and that the display quality will deteriorate.

As a specific mode of the present invention, an object of this invention is to provide technology capable of avoiding deterioration of the display quality in a liquid crystal display in which a plurality of openings are formed on an electrode.

SUMMARY OF THE INVENTION

The liquid crystal display according to the present invention comprises (a) a first substrate having a first electrode formed on one side, (b) a second substrate having a second electrode formed on one side and which is placed opposite to the first substrate so that the second electrode and the first electrode of the first substrate face each other, and (c) a liquid crystal layer provided between the first substrate and the second substrate, (d) wherein the first electrode includes a plurality of first openings provided in a regular checkered pattern with each first opening having a shape extending in a first direction, (e) wherein the second electrode includes a plurality of second openings provided in a regular checkered pattern with each second opening having a shape extending in the first direction, and (f) wherein the plurality of first openings and the plurality of second openings are relatively arranged so that each of the plurality of first openings is positioned between two second openings which are adjacent in a planar view among the plurality of second openings.

According to the display of the above-described invention, the distance between adjacent openings can be considerably expanded in the first electrode and the second electrode, respectively. Consequently, it is possible to avoid the increase in resistance value and disconnection of the electrodes caused by the connection of the openings, and thereby avoid deterioration of the display quality.

According to the display of the above-described invention, each of the plurality of first openings may be disposed so that one end part thereof and one end part of one adjacent second opening in the longitudinal direction in a planar view among the plurality of second openings are aligned in their mutual longitudinal directions.

According to the display of the above-described invention, each of the plurality of first openings may be disposed so that one end part thereof and one end part of one adjacent second opening in the longitudinal direction in a planar view among the plurality of second openings are partially overlapped.

Moreover, according to the display of the above-described invention, an outer edge in a longitudinal direction and an outer edge in a lateral direction of the plurality of first openings and the plurality of second openings may be intersected at a tilt, respectively.

DESCRIPTION OF THE PREFERRED EMBODIMENTS

Embodiments of the present invention are now explained with reference to the appended drawings.

Figure 1:
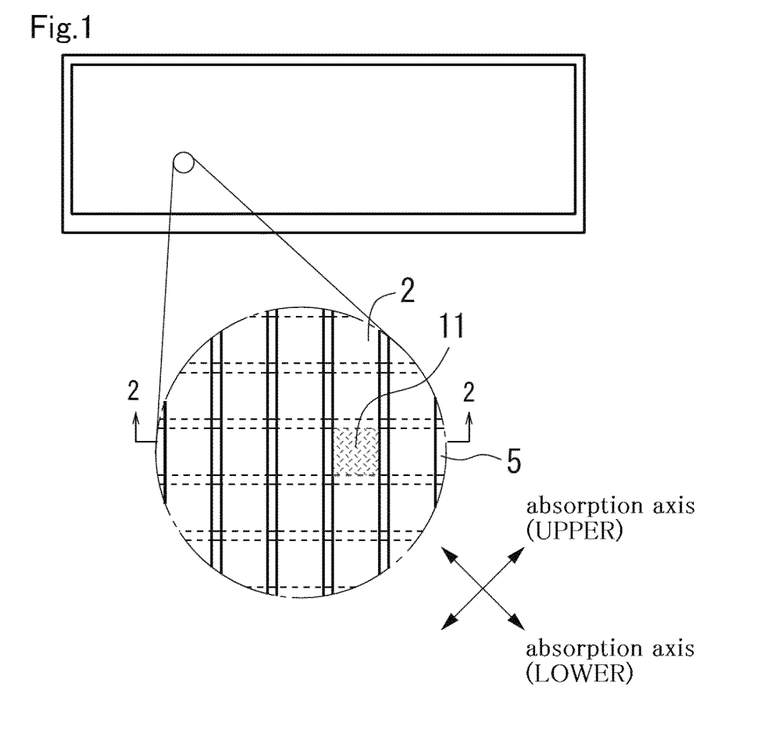
FIG. 1 shows a schematic external view and a partial enlarged view of the liquid crystal display according to one embodiment.
Figure 2:
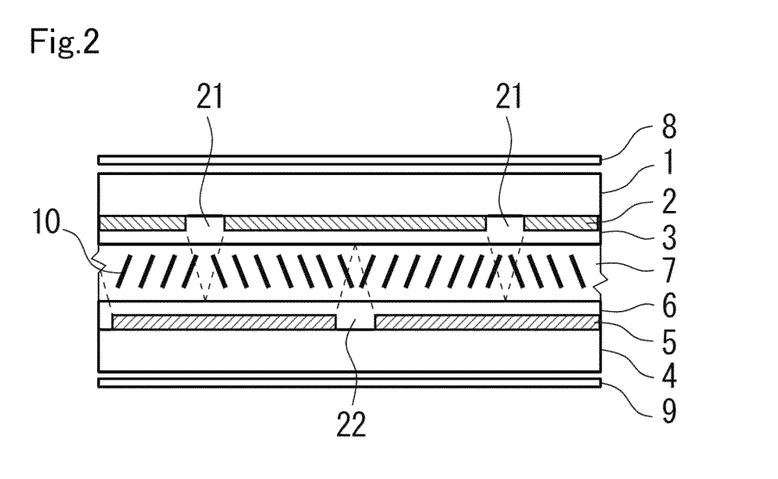
FIG. 2 is a partial cross section of line 2-2 of the liquid crystal display shown in FIG. 1.

FIG. 1 shows a schematic external view and a partial enlarged view of the liquid crystal display according to one embodiment. Moreover, FIG. 2 is a partial cross section of line 2-2 of the liquid crystal display shown in FIG. 1. The liquid crystal display of this embodiment shown in the respective drawings is configured by including an upper substrate (first substrate) 1, a plurality of upper electrodes (first electrodes) 2, an oriented film 3, a lower substrate (second substrate) 4, a plurality of lower electrodes (second electrodes) 5, an oriented film 6, a liquid crystal layer 7, an upper polarizing plate (first polarizing plate) 8, and a lower polarizing plate (second polarizing plate) 9.

As shown in the partial enlarged view of FIG. 1, with the liquid crystal display of this embodiment, the respective overlapping locations (intersecting areas) of the upper electrode 2 and the lower electrode 5 in a planar view become the pixel parts 11. Specifically, the liquid crystal display of this embodiment is a dot matrix-type liquid crystal display in which the pixel parts 11 are arranged in the two directions of a line writing direction and a columnwise direction. Note that, in FIG. 1, only one pixel part 11 is shown by being colored. In this embodiment, the respective widths of the upper electrode 2 and the lower electrode 5 are equal and set, for example, to 0.42 mm. Accordingly, the pixel part 11 of this embodiment is a square shape with all sides being 0.42 mm. Moreover, the mutual distance of the two adjacent upper electrodes 2 is set, for example, to 0.03 mm. Similarly, the mutual distance of the two adjacent lower electrodes 5 is set, for example, to 0.03 mm.

The upper substrate 1 and the lower substrate 4 are respectively transparent substrates such as a glass substrate, a plastic substrate or the like. Spacers (granular materials) are dispersed and arranged mutually between the upper substrate 1 and the lower substrate 4. As a result of these spacers, a gap between the upper substrate 1 and the lower substrate 4 is maintained at a predetermined distance (for example, approximately 4.0 micrometers).

The plurality of upper electrodes 2 are provided on one side of the upper substrate 1. The respective upper electrodes 2 are formed in a belt-like shape (stripe shape), and extend in one direction on one side of the upper substrate 1. In this embodiment, the respective upper electrodes 2 are extending in the vertical direction (first direction) in FIG. 1. The respective upper electrodes 2 are configured, for example, by patterning a transparent conductive film made of indium tin oxide (ITO) or the like as needed.

The plurality of lower electrodes 5 are provided on one side of the lower substrate 4. The respective lower electrodes 5 are formed in a belt-like shape, and extend in one direction on one side of the lower substrate 4. In this embodiment, the respective lower electrodes 5 are extending in the horizontal direction (second direction) in FIG. 1. The respective lower electrodes 5 are configured, for example, by patterning a transparent conductive film made of indium tin oxide (ITO) or the like as needed.

Here, as shown in FIG. 2, the upper electrode 2 has a plurality of first openings (slits) 21 with a shape extending in one direction. The respective first openings 21 are formed by partially removing the upper electrode 2. Similarly, the lower electrode 5 has a plurality of second openings (slits) 22 with a shape extending in one direction. The respective second openings 22 are formed by partially removing the lower electrode 5. As a result of adopting this kind of electrode structure, since the respective first openings 21 and the respective second openings 22 function as orientation controlling elements, a state (multi-domain orientation) where the orientation direction of the liquid crystal layer 7 is different in the two regions which are adjacent at the respective first openings 21 and the respective second openings 22 as the boundary can be obtained. Details regarding the shape of the respective first openings 21 and the respective second openings 22 will be described later.

The oriented film 3 is provided on one side of the upper substrate 1 so as to cover the respective upper electrodes 2. Similarly, the oriented film 6 is provided on one side of the lower substrate 4 so as to cover the respective lower electrodes 5. In this embodiment, as the oriented film 3 and the oriented film 6, used is a film (vertically oriented film) which regulates the oriented state of the liquid crystal layer 7 at its initial state (no voltage application) to a vertically oriented state.

The liquid crystal layer 7 is provided mutually between the respective upper electrodes 2 of the upper substrate 1 and the respective lower electrodes 5 of the lower substrate 4. In this embodiment, the liquid crystal layer 7 is configured by using a liquid crystal material (nematic liquid crystal material) in which the dielectric anisotropy Δc is negative (Δε<0). Bold lines 10 illustrated in the liquid crystal layer 7 schematically show the orientation direction (director) of the liquid crystal molecules during voltage application. With the liquid crystal display of this embodiment, the oriented state of the liquid crystal molecules of the liquid crystal layer 7 is vertically oriented in the initial state (state of no voltage application), and the oriented state of the liquid crystal molecules changes so as to intersect with the electric field direction based on voltage application.

The upper polarizing plate 8 is disposed on the outside of the upper substrate 1. Moreover, the lower polarizing plate 9 is disposed on the outside of the lower substrate 4. The upper polarizing plate 8 and the lower polarizing plate 9 are disposed, for example, in crossed nicols. As shown in FIG. 1, with this embodiment, the absorption axis of the upper polarizing plate 8 is set to an angle of 45° from the 3 o'clock to 9 o'clock direction (extending direction of the lower electrode 5), and the absorption axis of the lower polarizing plate 9 is set to a direction which is approximately orthogonal to the absorption axis of the upper polarizing plate 8.

An example of the method of manufacturing the liquid crystal display is now explained in detail.

Foremost, a substrate having a transparent electrode formed on one side thereof is prepared. As the substrate, for example, a glass substrate with an ITO transparent conductive film with a size of 300 mm×200 mm, thickness of 0.7 mm, and sheet resistance of 30 Ω can be used. A positive photoresist is applied on one side of the substrate with a roll coater, and the photoresist is subsequently exposed using a predetermined photomask. As the photomask, a photomask in which a predetermined open pattern is formed with a chromium metal film is used. The photomask used above is provided with an open pattern corresponding to the respective first openings 21 or the respective second openings 22.

After causing the foregoing photomask to adhere to the photoresist surface on the substrate, the open pattern on the photomask is burned onto the photoresist by irradiating infrared rays thereto. Subsequently, the photoresist is baked under predetermined conditions (for example, at 120° C. for 10 minutes). The photoresist of the portion that was irradiated with infrared rays is removed by performing wet development treatment to the baked photoresist using a KOH aqueous solution. Subsequently, the strength of the resist pattern is increased by further baking the photoresist (for example, at 120° C. for 30 minutes). The thus formed resist pattern is used as the etching mask, and a transparent electrode is etched thereby. Specifically, for example, wet etching using a mixed aqueous solution of hydrochloric acid and sulfuric acid of 40° C. is used. Finally, the photoresist is completely removed using a NaOH aqueous solution. A transparent electrode is thereby patterned on the substrate. Specifically, the upper substrate 1 with a plurality of first openings 21 and the lower substrate 4 with a plurality of second openings 22 are thereby respectively obtained.

Subsequently, the oriented film 3 is formed on one side of the upper substrate 1, and the oriented film 6 is formed on one side of the lower substrate 4. Specifically, after pattern-printing the material solution of the vertically oriented film on one side of the upper substrate 1 and on one side of the lower substrate 4, respectively, this is subject to baking (for example, at 180° C. for 30 minutes). Subsequently, a seal material is formed on one substrate (for example, on one side of the upper substrate 1). The seal material is formed by applying a material mixed with silica spacers having a grain size of several micrometers using the screen printing method or the like. Moreover, spacers having a grain size of several micrometers are sprayed on the other substrate (for example, on one side of the lower substrate 4). The spraying of the plastic spacers is performed, for example, by using the dry spraying method. Subsequently, the upper substrate 1 and the lower substrate 4 are laminated so that their respective one sides face each other, and the two are fixed by being baked under constant pressurization. The vacuum injection method or the like is used to thereafter inject a liquid crystal material (with dielectric anisotropy Δε<0) in the gap between the upper substrate 1 and the lower substrate 4, and baking is performed (for example, at 120° C. for 60 minutes) after sealing the inlet that was used for the foregoing injection. The liquid crystal layer 7 is thereby formed. Subsequently, the first polarizing plate 8 is laminated to the outside of the upper substrate 1, and the second polarizing plate 9 is laminated to the outside of the lower substrate 4. Moreover, a lead frame or the like is mounted as needed. The liquid crystal display is thereby completed.

Figure 3:
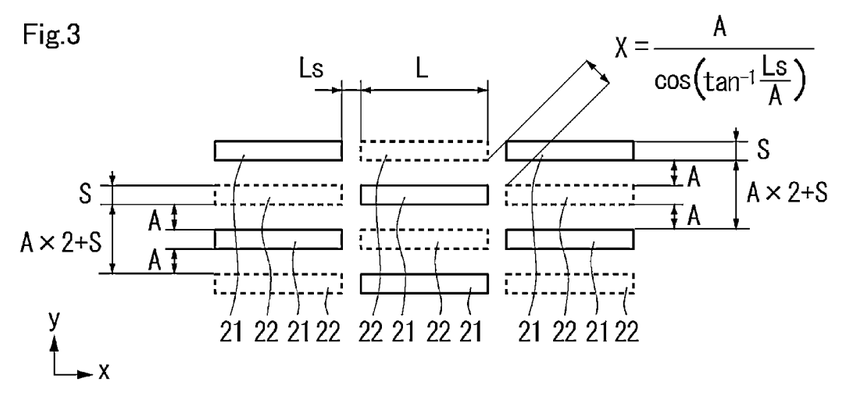
FIG. 3 is a schematic plan view showing the structure of the first opening and the second opening.

The structure of the first opening 21 and the second opening 22 is now explained with reference to the schematic plan view shown in FIG. 3. In FIG. 3, a part of the respective first openings 21 and the respective second openings 22 when observed from the side of the upper substrate 1 is shown planarly. In FIG. 3, the respective first openings 21 are shown with a solid line and the respective second openings 22 are shown with a dotted line. Note that, in the ensuing explanation, the first openings 21 and the second openings 22 may be collectively referred to simply as the "openings". In FIG. 3, S represents the length (lateral length) of the respective openings in the lateral direction, L represents the length (longitudinal length) of the respective openings in the longitudinal direction, Ls represents the distance (opening interval) between the adjacent openings, and A represents the edge interval of the adjacent openings in the lateral direction, respectively.

As shown in FIG. 3, the respective first openings 21 are formed in an oblong shape extending in one direction (x direction in FIG. 3), and are arranged regularly in a checkered pattern in the x direction and y direction in FIG. 3. Similarly, the respective second openings 22 are formed in an oblong shape extending in one direction (x direction in FIG. 3), and are arranged regularly in a checkered pattern in the x direction and y direction in FIG. 3. Specifically, the respective first openings 21 and the respective second openings 22 are arranged so that their respective longitudinal directions are aligned in approximately the same one direction (x direction in FIG. 3), and, more specifically, they are disposed so that their mutual long sides become approximately parallel. In this example, the longitudinal direction of the respective openings is parallel to the horizontal orientation of the liquid crystal display.

As shown in FIG. 3, in this embodiment, the respective first openings 21 and the respective second openings 22 are both provided in a regular checkered pattern. Moreover, the respective first openings 21 and the respective second openings 22 are relatively disposed so that each of the first openings 21 is positioned between two second openings 22 that are adjacent in a planar view among the respective second openings 22. To put it differently, the respective first openings 21 and the respective second openings 22 are disposed in a predetermined pitch along the x direction and the y direction, respectively, and are disposed by being mutually shifted at half pitch each. Consequently, the mutual distance of the two first openings 21 that are adjacent in the longitudinal direction and the mutual distance of the two second openings 22 that are adjacent in the longitudinal direction will both be L+Ls×2. When comparing this with the liquid crystal display disclosed in foregoing Patent Document 2, the mutual distance of the adjacent openings can be expanded considerably. Moreover, the mutual distance X of the nearest two first openings 21 and the mutual distance X of the nearest two second openings 22 can both be represented as A/cos(tan$^{-1}$Ls/A). Here, even assuming that Ls=0, X=A is obtained, and the distance thereof can be expanded considerably in comparison to the liquid crystal display disclosed in Patent Document 2.

The results of simulation analysis regarding whether a favorable oriented state can be obtained upon voltage application with the liquid crystal display having the respective openings as shown in FIG. 3 are now explained.

Figure 4A:
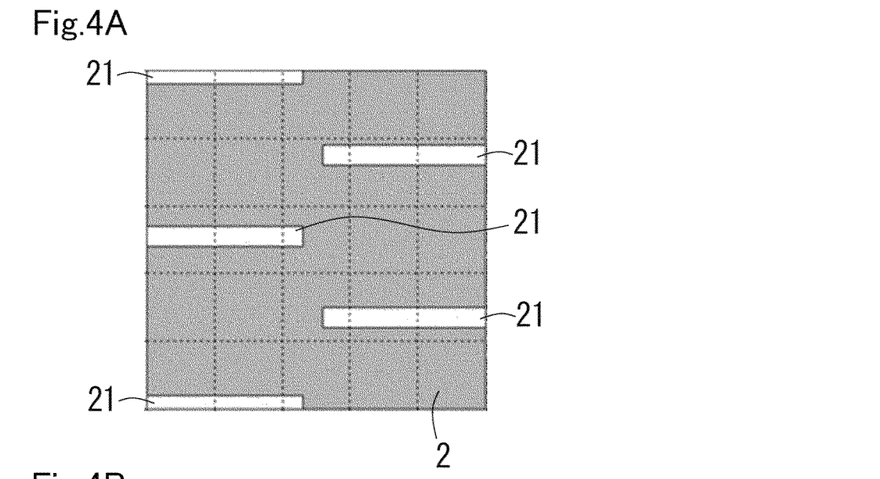
FIG. 4A and FIG. 4B are diagrams explaining the condition setting of the respective openings used in the simulation analysis.
Figure 4B:
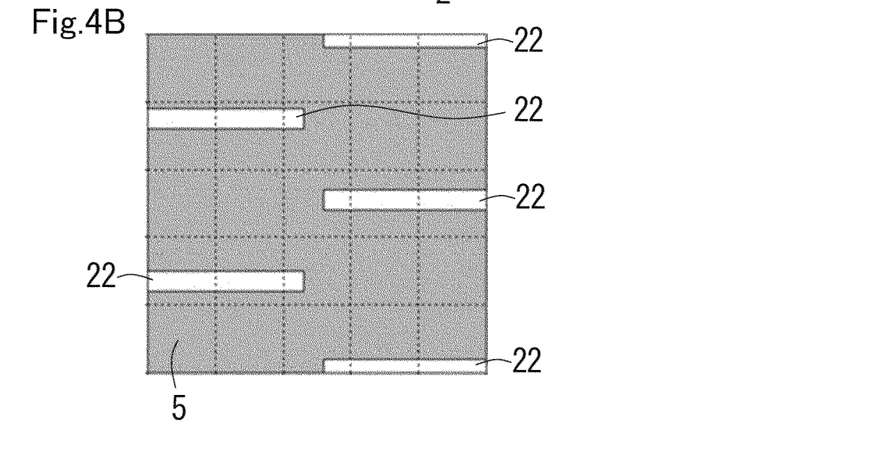

FIG. 4A and FIG. 4B are diagrams explaining the condition setting of the respective openings used in the simulation analysis. FIG. 4A shows the structure of the upper electrode 2 provided with the respective first openings 21, and FIG. 4B shows the structure of the lower electrode 5 provided with the respective second openings 22. Note that, in the drawings, the portions that are colored and filled in are the regions where the conductive film exists. The size of each opening was set to L=0.0736 mm, Ls=0.0097 mm, A=0.0288 mm, and S=0.0097 mm. Moreover, the layer thickness of the liquid crystal layer 7 was set to 4 micrometers, the refractive index anisotropy Δn of the liquid crystal material was set to approximately 0.09, the dielectric anisotropy Δε was set to approximately −5, and the pretilt angle of the liquid crystal molecules was set to 90°. The arrangement of the upper polarizing plate 8 and the lower polarizing plate 9 was set as described above. Under these conditions, the orientation distribution of the liquid crystal molecules in a steady state where the reorientation of the liquid crystal molecules of the liquid crystal layer 7 is steady was obtained based on simulation when the potential of the lower electrode 5 was set to 0 V and the potential of the upper electrode 2 was set to +4 V, and the in-plane transmissivity distribution upon observing the liquid crystal display from a normal direction was evaluated. Note that the number of elements that were used in the simulation analysis was as follows; specifically, the in-plane of the liquid crystal display was set to 60×60, and divided into thirty in the thickness direction.

Figure 5:
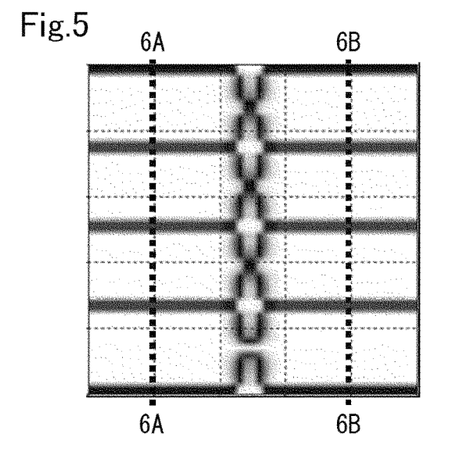
FIG. 5 is a diagram showing the simulation analysis results (in-plane transmissivity distribution).

FIG. 5 is a diagram showing the simulation analysis results (in-plane transmissivity distribution). The portions where the respective openings exist are shown as a dark region since voltage is not applied between the electrodes. In addition, a cross-shaped dark region is observed in the corresponding regions between the first opening 21 and the second opening 22 which are adjacent in the longitudinal direction in a planar view and the upper and lower regions thereof. This dark region is considered to be the boundary region of the orientation domain in which the orientation direction of the liquid crystal molecules differs 180°, and is considered to be caused as a result of the orientation direction of the liquid crystal molecules rotating during the voltage application. This is now explained below.

Figure 6A:
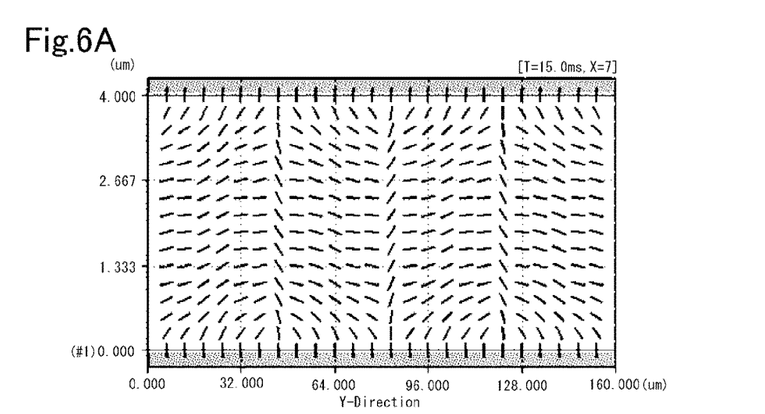
FIG. 6A and FIG. 6B are diagrams showing the director distribution of the liquid crystal molecules within the liquid crystal layer.
Figure 6B:
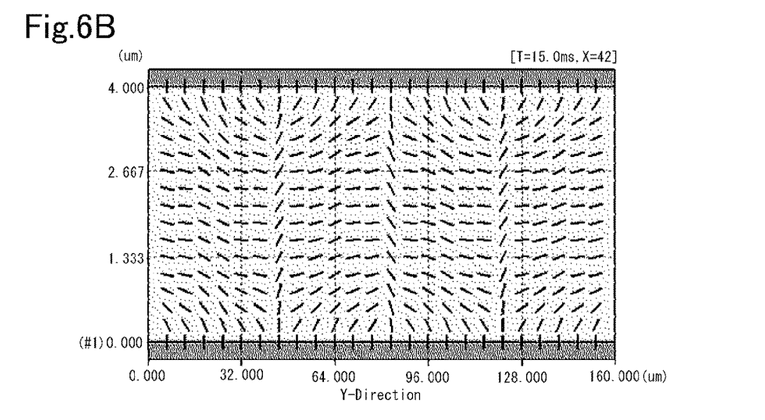

FIG. 6A and FIG. 6B are diagrams showing the director distribution of the liquid crystal molecules within the liquid crystal layer. Specifically, FIG. 6A shows the director distribution in the cross section in the direction of line 6A-6A shown in FIG. 5, and FIG. 6B shows the director distribution in the cross section in the direction of line 6B-6B shown in FIG. 5. In the respective drawings, the vertical direction shows the layer thickness direction of the liquid crystal layer 7, and the director distribution is indicated with a bar line. When focusing on the region that is closer to the upper substrate 1 or the lower substrate 4 than the central part of the liquid crystal layer 7, a state where the direction of tilt of the liquid crystal molecules is periodically inverted 180° from left to right in the drawings can be observed. An opening exists in the upper electrode 2 or the lower electrode 5 at the portion where the director is inverted. The orientation of the liquid crystal molecules is controlled by the diagonal electric field between the electrodes generated around the respective openings, and favorable 2 domain orientation control is realized. Upon comparing the respective direction distributions of FIG. 6A and FIG. 6B, at the same positions in the horizontal direction, excluding the portions where the respective openings are disposed, it is evident that the direction of tilt of the liquid crystal molecules is inverted 180°. Specifically, the orientation domains which are adjacent in the longitudinal direction of the respective openings are of an oriented state that is different from a conventional structure where the orientation directions thereof are mutually inverted 180°, and it is evident that the orientation domains showing the same orientation direction are arranged in a checkered pattern.

Figure 7:
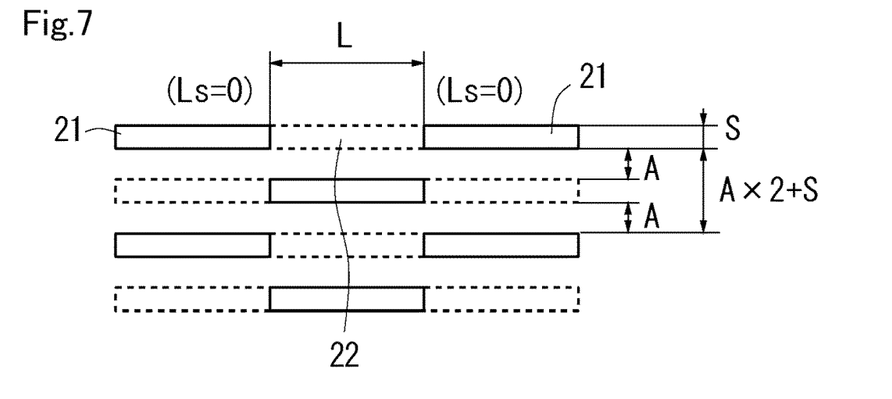
FIG. 7 is a schematic plan view showing the structure of the first opening and the second opening upon setting Ls to 0.
Figure 8:
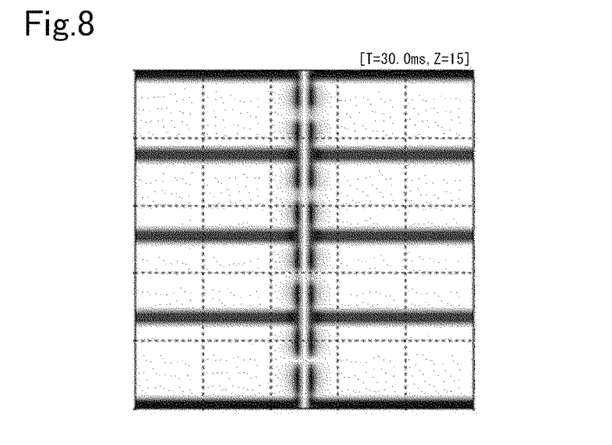
FIG. 8 shows the simulation analysis results (in-plane transmissivity distribution) upon setting Ls to 0.

The simulation analysis in the case of setting the distance Ls between the adjacent openings to 0 is now explained. FIG. 7 is a schematic plan view showing the structure of the first opening 21 and the second opening 22 upon setting Ls to 0. As shown in FIG. 7, when Ls=0, each of the respective first openings 21 is disposed so that one end part thereof and one end part of one adjacent second opening 22 in the longitudinal direction in a planar view are aligned in their mutual longitudinal directions. Specifically, the edges (lateral edges) of the openings will overlap. The simulation analysis results (in-plane transmissivity distribution) in the foregoing case are shown in FIG. 8. Note that the simulation conditions are the same as those explained above with reference to FIG. 4A and FIG. 4B other than setting Ls to 0. As shown in FIG. 8, it was discovered that the area of the dark region at the boundary part where the orientation domain is inverted 180° decreased comparatively.

Figure 9:
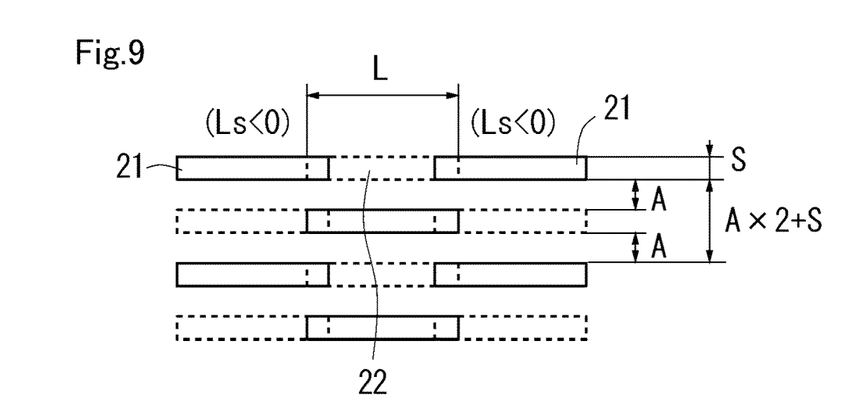
FIG. 9 is a schematic plan view showing the structure of the first opening and the second opening upon setting Ls to a negative value.
Figure 10:
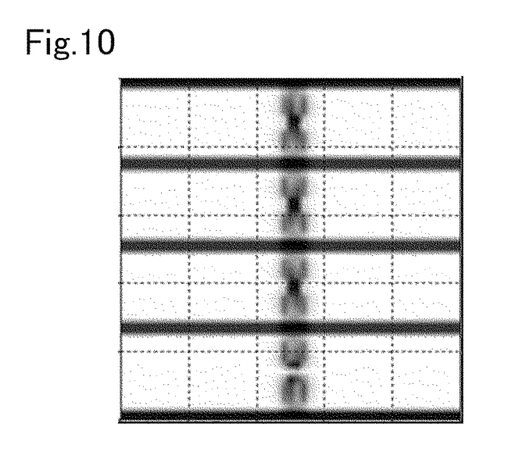
FIG. 10 shows the simulation analysis results (in-plane transmissivity distribution) upon setting Ls to a negative value.

The simulation analysis in the case of setting the distance L between the adjacent openings to a negative value (Ls<0) is now explained. FIG. 9 is a schematic plan view showing the structure of the first opening 21 and the second opening 22 upon setting Ls to a negative value. As shown in FIG. 9, when Ls<0, each of the respective first openings 21 is disposed so that one end part thereof and one end part of one adjacent second opening 22 in the longitudinal direction in a planar view are partially overlapped. The simulation analysis results (in-plane transmissivity distribution) in the foregoing case are shown in FIG. 10. Note that the simulation conditions are the same as those explained above with reference to FIG. 4A and FIG. 4B other than setting Ls to −0.0097 mm (−9.7 micrometers). As shown in FIG. 10, the area of the dark region at the boundary part where the orientation domain is inverted 180° has not changed significantly from the case where Ls=0. In any case, if the size of Ls is set to be approximately the same as the size of the length S of the respective openings in the lateral direction, it is considered that the area of the dark region that occurs at the boundary portion of the orientation domain can be reduced comparatively.

Figure 11:
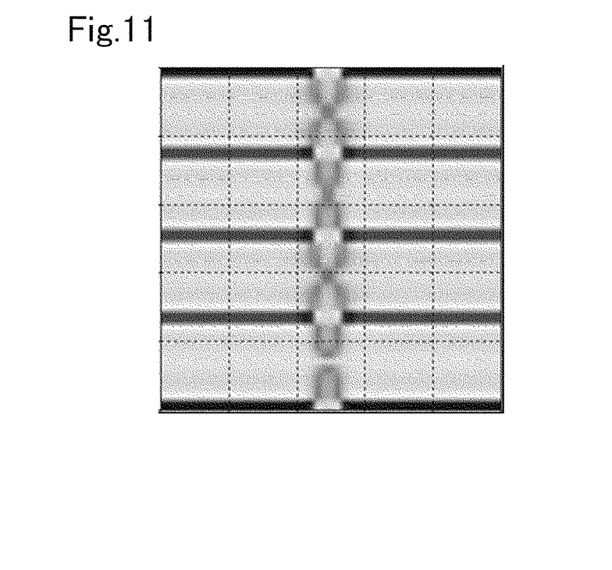
FIG. 11 shows the simulation analysis results (in-plane transmissivity distribution) upon setting the chiral pitch of the liquid crystal layer to 10 micrometers.

A case of adding a chiral material to the liquid crystal layer 7 in order to further raise the transmissivity of the dark region at the boundary region where the orientation domain is rotated 180° is now explained. As one example, in the foregoing embodiment where Ls was set to −0.0097 mm (−9.7 micrometers), simulation analysis was performed upon setting the chiral pitch p of the liquid crystal layer 7 to 10 micrometers. The simulation analysis results (in-plane transmissivity distribution) are shown in FIG. 11. As shown in FIG. 11, although it was not possible to completely erase the dark region at the boundary portion of the orientation domain, it was discovered that the transmissivity can be further raised. Nevertheless, if a chiral material is added to the liquid crystal layer 7, the transmissivity inside the orientation domain other than at the boundary portion of the orientation domain tends to decrease comparatively. In response, it is desirable to set the layer thickness d of the liquid crystal layer 7 and the Δn of the liquid crystal material to be relatively great. In order to raise the transmissivity of the dark region, d/p is set to be greater than 0.25, preferably 0.8 or less, and more preferably 0.74 or less.

Note that, although the several embodiments described above used fixed values for the respective parameters of L, A and S of the respective openings, the present invention is not limited thereto. S is preferably around 0.005 mm to 0.03 mm, and A is preferably around 0.01 mm to 0.06 mm. The lower limit of L is preferably greater than A and greater than 0.04 mm. The upper limit of L is preferably around ½ of the pattern shape; that is, the display size of the upper electrode 2 or the lower electrode 5, and is basically considered to be preferable at around 5 mm or less.

Another embodiment of the foregoing liquid crystal display is now explained.

Figure 12:
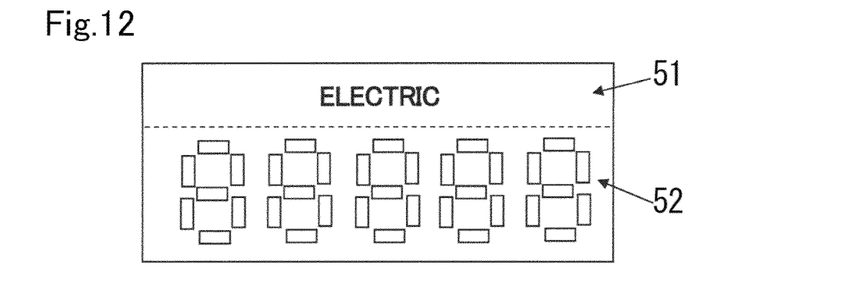
FIG. 12 shows a schematic plan view of the effective display area of the liquid crystal display that is divided into a plurality of areas.
Figure 13:
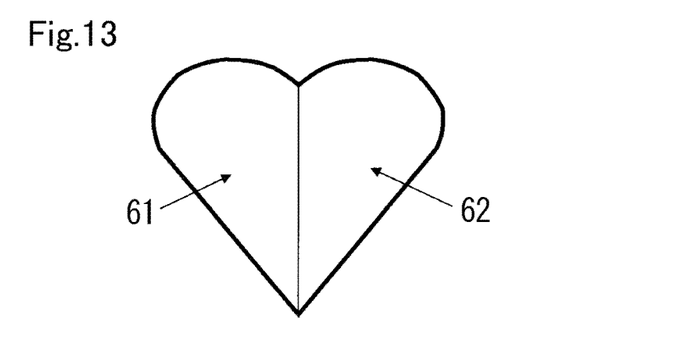
FIG. 13 shows a schematic plan view, in case of displaying a segment with a relatively large display area, and one segment display area being divided into a plurality of areas.

The foregoing embodiments explained a case of arranging the respective openings in a regular checkered pattern on the entire surface of the effective display area of the liquid crystal display, but the present invention is not limited thereto. For example, as with the schematic plan view shown in FIG. 12, the effective display area of the liquid crystal display can be divided into a plurality of areas, and the orientation parameter of the respective openings may be set differently in each of the foregoing areas. For example, the effective display area can be divided into a character display area 51 which displays "ELECTRIC" and seven segment display areas 52 of five digits, the longitudinal direction of the respective openings in the character display area 51 can be set to diagonally upward right (diagonally downward left), and the longitudinal direction of the respective openings in the seven segment display areas 52 can be set to diagonally upward left (diagonally downward right). Moreover, as shown in FIG. 13, in cases of displaying a segment with a relatively large display area, one segment display area can be divided into a plurality of areas, and the orientation parameter of the respective openings may be set differently in each of the foregoing areas. In the illustrated example, a heart-shaped character display area is divided into a left-side area 61 and a right-side area 62.

Figure 14:
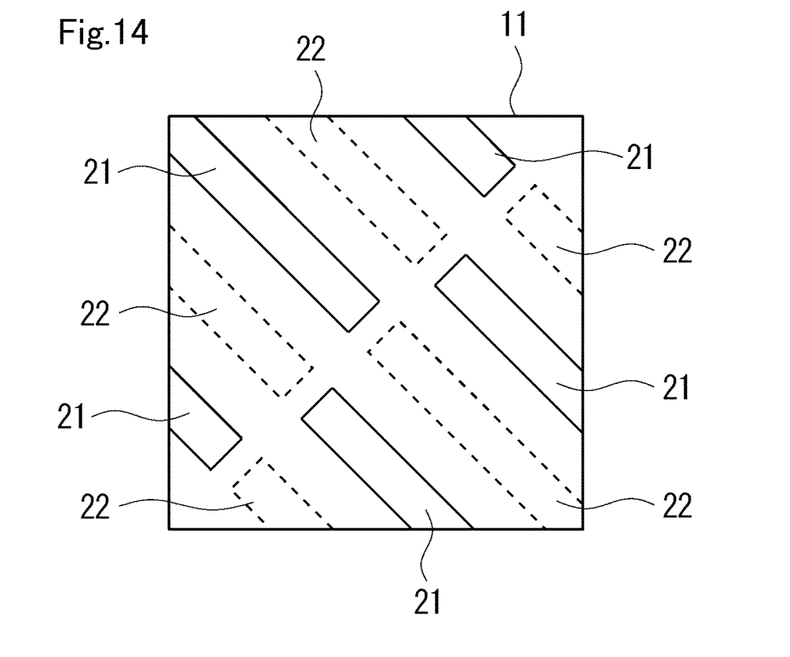
FIG. 14 shows a schematic plan view, in the case of adopting a dot matrix-type electrode structure, where the setting may be such that the length L of the respective openings in the longitudinal direction in one pixel part is not equal.

Moreover, as shown in FIG. 14, in the case of adopting a dot matrix-type electrode structure, the setting may be such that the length L of the respective openings in the longitudinal direction in one pixel part 11 is not equal. Specifically, if the respective ends of the first opening 21 or the second opening 22 overlap with the edge of the pixel part 11, the length L in the longitudinal direction may be shortened. However, the lateral position where adjacent openings exist, preferably exists approximately on the same straight line in the longitudinal direction. In the foregoing case, although the boundary region of the orientation domain is extending in the diagonally upward right direction (diagonally downward left direction), it is evident that the short sides of the respective openings disposed in this area are respectively disposed approximately along and on the straight line extending in the diagonally upward left direction (diagonally downward right direction).

Figure 15:
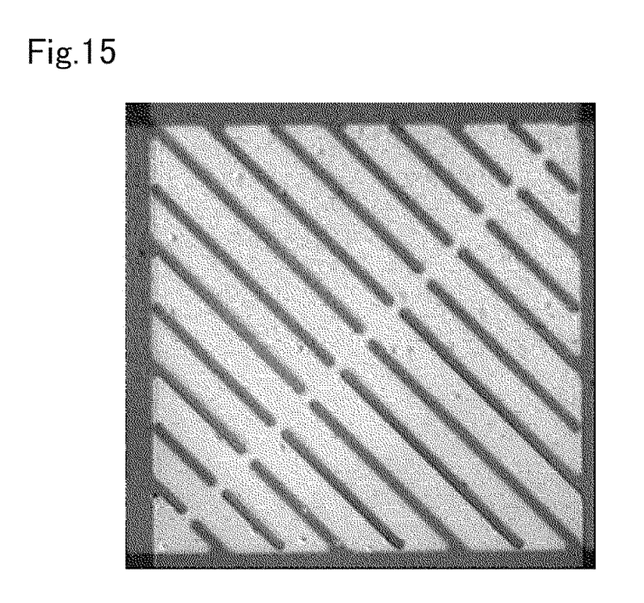
FIG. 15 is a diagram showing an image obtained by actually preparing the liquid crystal display with the respective openings of the structure shown in FIG. 14 and observing on one pixel part thereof with a reflection microscope.

FIG. 15 is a diagram showing an image obtained by actually preparing the liquid crystal display with the respective openings of the structure shown in FIG. 14 and observing on one pixel part 11 thereof with a reflection microscope. As described above, an upper electrode 2 of a belt-like shape was provided in the vertical direction of the liquid crystal display, and a lower electrode 5 of a belt-like shape was provided in the horizontal direction (refer to FIG. 1). Subsequently, the upper electrode 2 and the lower electrode 5 were provided with the respective openings for realizing 2 domain orientation control of a checkered pattern rotated approximately 45° in the clockwise direction with the 9 o'clock orientation of the liquid crystal display as the reference and rotated approximately 45° in the clockwise direction with the 3 o'clock orientation of the liquid crystal display as the reference. The illustrated one pixel part is a 0.45 mm-square pixel, and the mutual interval of the adjacent pixel parts 11 is 0.03 mm. The pixel part 11 is divided into two in the diagonal direction, and the respective openings are disposed in a checkered pattern in the upper electrode 2 and the lower electrode 5, respectively. The parameters of the respective openings were as follows; namely, S was approximately 0.007 mm, A was approximately 0.03 mm, and Ls was approximately 0.007 mm. With respect to the respective absorption axes of the upper polarizing plate 8 and the lower polarizing plate 9, the optical axis was disposed at approximately 45° relative to the longitudinal direction of the respective openings. Specifically, with the lower polarizing plate 9, the absorption axis was disposed in the horizontal orientation of the pixel part 11, and, with the upper polarizing plate 8, the absorption axis was disposed in the vertical orientation of the pixel part 11. Note that a material with a Δn of 0.15 was used as the liquid crystal material, and the layer thickness of the liquid crystal layer 7 was set to approximately 3.8 micrometers.

Figure 16A:
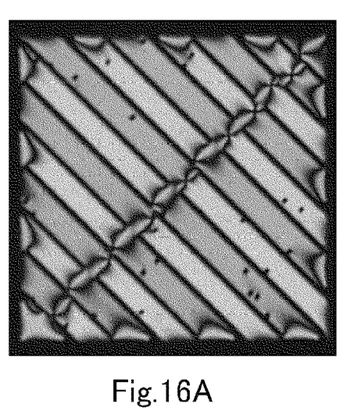
FIG. 16A, FIG. 16B and FIG. 16C are diagrams showing the polarization microscopic image of the pixel part upon voltage application upon preparing the liquid crystal display shown in FIG. 15.

FIG. 16A is a diagram showing the polarization microscopic image of the pixel part 11 upon voltage application upon preparing the liquid crystal display shown in FIG. 15 using the liquid crystal material to which a chiral material was not added. In this observation image, with respect to the arrangement of the polarizing plate of the liquid crystal display, the absorption axis of the upper polarizing plate (first polarizing plate) 8 was set to the 9 o'clock to 3 o'clock orientation, and the absorption axis of the lower polarizing plate (second polarizing plate) 9 was set to the 6 o'clock to 12 o'clock orientation. It can be seen that dark regions were not observed outside the boundary region of the orientation domain and in the vicinity of the edge of the pixel part 11, and a favorable orientated was obtained. Based on external observation, it was confirmed that uniform and favorable 2 domain orientation control has been realized. Thus, it is considered that the orientation domain is disposed in a checkered pattern as with the case of the foregoing simulation analysis. Meanwhile, although a dark region is observed in the boundary region of the orientation domain, its area is relatively small, and the orientation pattern is relatively uniform. Approximately similar dark regions were observed with the other pixel parts 11.

Figure 16B:
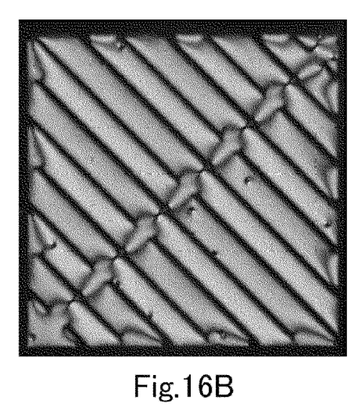

FIG. 16B is a diagram showing the polarization microscopic image of the pixel part 11 upon voltage application upon preparing the liquid crystal display shown in FIG. 15 using the liquid crystal material to which a chiral material was added so that the d/p becomes approximately 0.6. As with the case of FIG. 16A, the respective orientation domains were able to obtain an extremely uniform oriented state, and it has been confirmed that the transmissivity has risen in comparison to the case of not adding a chiral material at the boundary portion of the orientation domain.

Figure 16C:
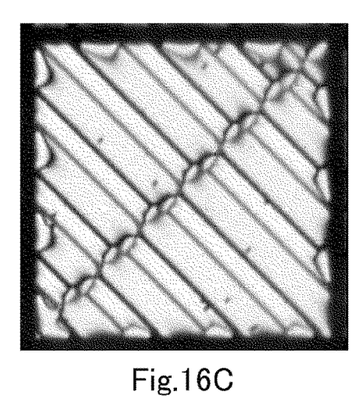

The foregoing description examined a case where the longitudinal orientation of the adjacent openings is on approximately the same straight line, but during the actual manufacture, there may be cases where misalignment occurs. Thus, the orientation texture was observed also in cases where the longitudinal orientation of the adjacent openings is not on the same straight line. The polarization microscopic image thereof is shown in FIG. 16C. In this example, the opening disposed diagonally upward left and the opening disposed diagonally downward right adjacent thereto are misaligned in an amount that is equivalent to the short side of the respective openings. As shown in FIG. 16C, the regularity of the pattern is retaining even at the boundary region of the orientation domain, and superficially it has been confirmed that 2 domain orientation control is being realized. Nevertheless, when actually observing the viewing-angle characteristics, a slight deformation in the equal luminance curve during voltage application can be acknowledged. There is fluctuation in the tolerance of the misalignment of the opening based on the distance of A. A is optimally around 0.02 to 0.06. Accordingly, it is considered that the misalignment of the openings within the foregoing range is tolerated.

Figure 17A:
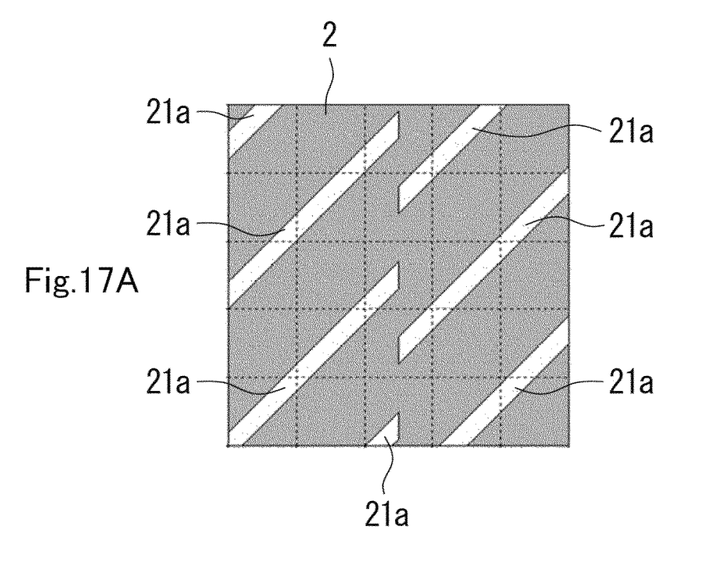
FIG. 17A and FIG. 17B are diagrams explaining an embodiment in which the shape of the respective openings is changed.
Figure 17B:
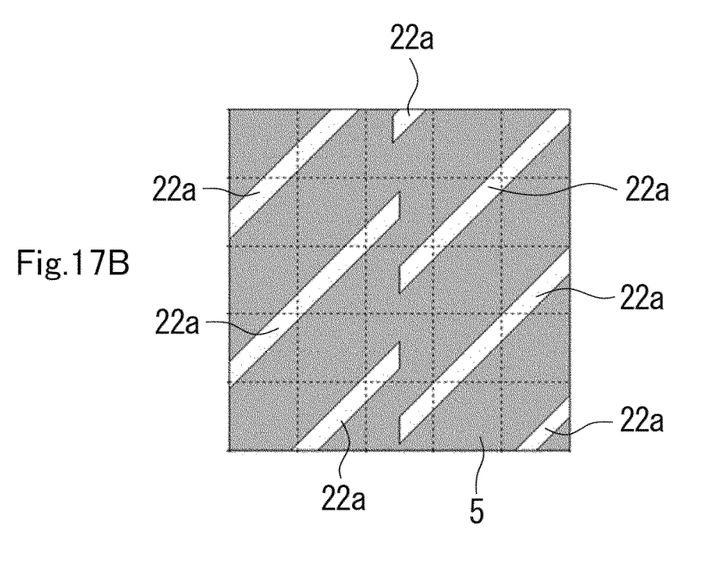

FIG. 17A and FIG. 17B are diagrams explaining an embodiment in which the shape of the respective openings is changed. As shown in FIG. 17A, the respective first openings 21a provided to the upper electrode 2 are formed in a rectangular shape extending in one direction, and are regularly arranged in a checkered pattern. The respective first openings 21a are intersecting diagonally at an angle in which the side (outer edge) in the longitudinal direction and the end (outer edge) in the lateral direction is not 90°, and this point is different from the respective first openings 21 in each of the foregoing embodiments. Moreover, as shown in FIG. 17B, the respective second openings 22a provided to the lower electrode 5 are formed in a rectangular shape extending in one direction, and are regularly arranged in a checkered pattern. The respective second openings 22a are intersecting diagonally at an angle in which the side (outer edge) in the longitudinal direction and the end (outer edge) in the lateral direction is not 90°, and this point is different from the respective second openings 22 in each of the foregoing embodiments. As a result of adopting this kind of structure, the boundary region of the orientation domain can be controlled to be approximately the same direction as the sides of the respective opening in the lateral direction.

Figure 18A:
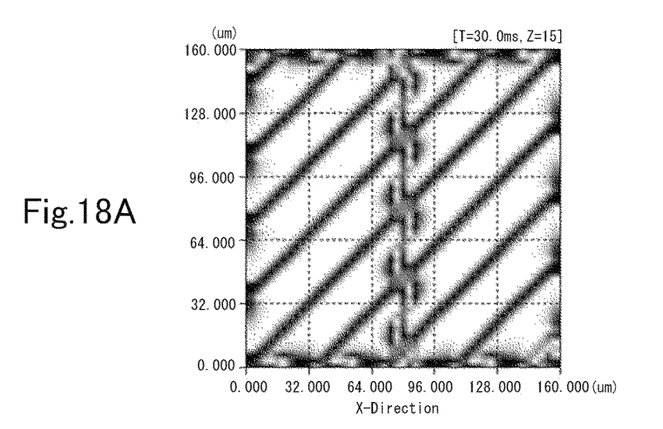
FIG. 18A and FIG. 18B are diagrams showing the simulation analysis results of the liquid crystal display with the respective openings of the structure shown in FIG. 17A and FIG. 17B.
Figure 18B:
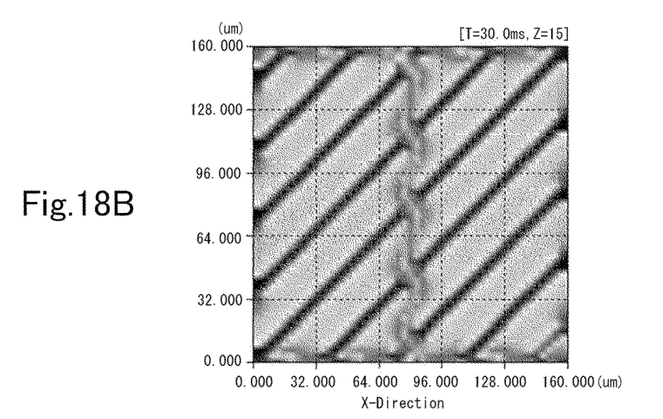

FIG. 18A and FIG. 18B are diagrams showing the simulation analysis results of the liquid crystal display with the respective openings of the structure shown in FIG. 17A and FIG. 17B. Note that the respective parameters were set as illustrated; namely, A was set to 0.032 mm, S was set to 0.009 mm, and L was set to 0.113 mm. The other calculation conditions were the same as each of the foregoing embodiments. FIG. 18A shows the transmissivity distribution upon observing the liquid crystal display from a normal direction. In the respective analytical results, with respect to the arrangement of the polarizing plate of the liquid crystal display, the absorption axis of the upper polarizing plate (first polarizing plate) 8 was set to the 9 o'clock to 3 o'clock orientation, and the absorption axis of the lower polarizing plate (second polarizing plate) 9 was set to the 6 o'clock to 12 o'clock orientation. Favorable orientation uniformity was obtained with the orientation domains existing between the respective openings. Moreover, although the boundary region of the orientation domain is slightly wavelike, the dark region is occurring approximately along a vertical direction, and, since its pattern is regular, it is considered that, superficially, there will be no display defect. Based on these results, it was confirmed that the direction of the boundary portion of the orientation domain can be controlled based on the direction of the sides of the respective openings in the lateral orientation. FIG. 18B shows the transmissivity distribution upon observing, from a normal direction, the liquid crystal display formed with the liquid crystal layer 7 using the liquid crystal material to which a chiral material was added so that the chiral pitch p would be 10 micrometers. It was confirmed that the transmissivity of the dark region at the boundary portion of the orientation domain can be raised by adding a chiral material.

Note that, in this simulation analysis, the boundary portion of the orientation domain was disposed in the vertical direction, but it is evident that the boundary portion of the orientation domain can be changed to the horizontal direction by rotating the arrangement of the respective openings 90° in the clockwise or counterclockwise direction. In addition, it is also evident that the extending direction of the boundary portion of the orientation domain can be arbitrarily set by changing the angle formed by the outer edge of the respective openings in the lateral direction and the outer edge of the respective openings in the longitudinal direction existing at the boundary portion of the orientation domain. The boundary portion of the orientation domain can sometimes be visually confirmed superficially, but it can be maintained in a state of being inconspicuous in terms of appearance by controlling such boundary portion, for example, to the horizontal direction or vertical direction of the liquid crystal display by using the foregoing structure.

According to this embodiment described above, the distance between adjacent openings can be considerably expanded in the upper electrode and the lower electrode, respectively. Consequently, it is possible to avoid the increase in resistance value and disconnection of the electrodes caused by the connection of the openings, and thereby avoid deterioration of the display quality.

Note that this invention is not limited to the subject matter of the foregoing embodiments, and can be implemented by being variously modified within the scope of the gist of the present invention. For example, although the first opening and second opening were approximately of the same size in the foregoing embodiments, they may be of a different size. Moreover, the relative relationship of the longitudinal direction of the respective first openings and the respective second openings and the horizontal direction of the liquid crystal display can be set arbitrarily. Moreover, although each of the foregoing embodiments explained a liquid crystal display with a vertical alignment liquid crystal layer, the oriented state of the liquid crystal layer is not limited to the above, similar 2 domain orientation control is also possible in a horizontal orientation mode in which the pretilt angle is close to 0°; for example, in the ECB mode, the TN mode, and the STN mode.

What is claimed is:
1. A liquid crystal display, comprising:
a first substrate having a plurality of first pixel electrodes formed on one side;
a second substrate having a plurality of second pixel electrodes formed on one side and which is placed opposite to the first substrate so that each of the second pixel electrodes and a corresponding one of the first pixel electrodes of the first substrate face each other; and
a liquid crystal layer provided between the first substrate and the second substrate,
wherein a plurality of first openings per first pixel electrode are provided on each of the first pixel electrodes in a regular checkered pattern with each first opening having a length extending in a first direction and a width extend- ing in a second direction, and the length of each first opening is larger than the width of each first opening, wherein a plurality of second openings per second pixel electrode are provided on each of the second pixel electrodes in a regular checkered pattern with each second opening having a length extending in the first direction and a width extending in the second direction, and the length of each second opening is larger than the width of each second opening, wherein in a planar view of the liquid crystal display the plurality of first openings and the plurality of second openings are alternately arranged in the first direction so that in the planar view of the liquid crystal display every two immediately adjacent openings aligned along the first direction are one of the first openings and one of the second openings, and wherein every two immediately adjacent openings of the first pixel electrodes are two of the first openings, and every two immediately adjacent openings of the second pixel electrodes are two of the second openings.

2. The liquid crystal display according to claim 1, wherein an outer edge in a longitudinal direction and an outer edge in a lateral direction of the plurality of first openings and the plurality of second openings are intersecting at a tilt, respectively.

3. The liquid crystal display according to claim 1, wherein in the planar view of the liquid crystal display the plurality of first openings and the plurality of second openings are also alternately arranged in the second direction so that in the planar view of the liquid crystal display every two immediately adjacent openings aligned along the second direction are one of the first openings and one of the second openings.

4. The liquid crystal display according to claim 1, wherein in the planar view of the liquid crystal display every two immediately adjacent second openings aligned along the first direction are separated by a corresponding one of the plurality of first openings that is aligned along the first direction.

5. The liquid crystal display according to claim 4, wherein in the planar view of the liquid crystal display every two immediately adjacent second openings aligned along the second direction are separated by a corresponding one of the plurality of first openings that is aligned along the second direction.

6. The liquid crystal display according to claim 1, wherein the first pixel electrodes and the second pixel electrodes are rectangular.

* * * * *